(12) United States Patent
Audenaert et al.

(10) Patent No.: US 7,094,829 B2
(45) Date of Patent: Aug. 22, 2006

(54) FLUOROCHEMICAL COMPOSITION COMPRISING A FLUORINATED POLYMER AND TREATMENT OF A FIBROUS SUBSTRATE THEREWITH

(75) Inventors: Frans A. Audenaert, Kaprijke (BE); Rudolf J. Dams, Antwerp (BE); Richard S. Buckanin, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 58 days.

(21) Appl. No.: 10/444,878

(22) Filed: May 23, 2003

(65) Prior Publication Data

US 2004/0077775 A1     Apr. 22, 2004

Related U.S. Application Data

(60) Provisional application No. 60/383,349, filed on May 24, 2002.

(51) Int. Cl.
*C08K 3/00* (2006.01)

(52) U.S. Cl. ...................... 524/544; 524/276; 524/278

(58) Field of Classification Search ................ 524/544, 524/276, 278
See application file for complete search history.

(56) References Cited

U.S. PATENT DOCUMENTS

| | | | |
|---|---|---|---|
| 2,567,011 A | 9/1951 | Diesslin et al. | |
| 2,764,603 A | 9/1956 | Ahlbrecht | |
| 2,803,615 A | 8/1957 | Ahlbrecht et al. | |
| 2,839,515 A | 6/1958 | Ahlbrecht et al. | |
| 2,941,988 A | 6/1960 | Wolf | |
| 2,995,542 A | 8/1961 | Brown | |
| 3,250,808 A | 5/1966 | Moore, Jr. et al. | |
| 3,274,239 A | 9/1966 | Selman | |
| 3,274,244 A | 9/1966 | Mackenzie | |
| 3,356,628 A | 12/1967 | Smith et al. | |
| 3,412,148 A | 11/1968 | Arbogast | |
| 3,446,761 A | 5/1969 | Antonelli et al. | |
| 3,450,562 A | 6/1969 | Hoeschele | |
| 3,536,710 A | 10/1970 | Bartlett | |
| 3,536,749 A | 10/1970 | Groves | |
| 3,553,179 A | 1/1971 | Bartlett | |
| 3,555,089 A | 1/1971 | Bartlett | |
| 3,621,059 A | 11/1971 | Barlett | |
| 3,755,242 A | 8/1973 | Reich | |
| 3,814,741 A * | 6/1974 | Caporiccio et al. | 526/246 |
| 3,862,989 A | 1/1975 | Hansen | |
| 3,896,251 A | 7/1975 | Landucci | |
| 4,024,178 A | 5/1977 | Landucci | |
| 4,215,204 A | 7/1980 | Chattha | |
| 4,215,205 A | 7/1980 | Landucci | |
| 4,424,438 A | 1/1984 | Antelman et al. | |
| 4,487,964 A | 12/1984 | Watson, Jr. et al. | |
| 4,525,423 A | 6/1985 | Lynn et al. | |
| 4,529,658 A | 7/1985 | Schwartz et al. | |
| 4,587,301 A | 5/1986 | Watson, Jr. et al. | |
| 4,668,726 A | 5/1987 | Howells | |
| 4,681,925 A | 7/1987 | Strepparola et al. | |
| 4,851,472 A | 7/1989 | Famili et al. | |
| 4,977,219 A | 12/1990 | Watson, Jr. | |
| 5,011,713 A | 4/1991 | Lenti et al. | |
| 5,132,028 A | 7/1992 | Nagase et al. | |
| 5,276,175 A | 1/1994 | Dams et al. | |
| 5,294,248 A | 3/1994 | Chittofrati et al. | |
| 5,410,010 A | 4/1995 | Tonelli et al. | |
| 5,424,438 A | 6/1995 | Chittofrati et al. | |
| 5,623,037 A * | 4/1997 | Simeone et al. | 526/247 |
| 5,674,951 A | 10/1997 | Hargis et al. | |
| 5,747,629 A | 5/1998 | Yeske et al. | |
| 5,817,249 A | 10/1998 | Audenaert et al. | |
| 5,965,659 A | 10/1999 | Kubo et al. | |
| 6,001,923 A | 12/1999 | Moncur et al. | |
| 6,080,830 A | 6/2000 | Dirschl et al. | |
| 6,239,247 B1 | 5/2001 | Allewaert et al. | |
| 6,242,557 B1 | 6/2001 | Temtchenko et al. | |
| 6,376,572 B1 * | 4/2002 | Turri | 522/173 |
| 6,391,459 B1 * | 5/2002 | Szum et al. | 428/421 |
| 2003/0105263 A1 | 6/2003 | Fan et al. | |

FOREIGN PATENT DOCUMENTS

| | | |
|---|---|---|
| CA | 725740 | 1/1966 |
| EP | 0 435 641 | 7/1991 |

(Continued)

OTHER PUBLICATIONS

Douglas Wicks and Zeno W. Wicks Jr., "Blocked isocyanates III.: Part. A, Mechanisms and chemistry" by Progress in Organic Coatings, 36, pp. 148-172, (1999).

(Continued)

*Primary Examiner*—David W. Wu
*Assistant Examiner*—Henry S. Hu

(57) ABSTRACT

A fluorochemical composition for rendering fibrous substrates oil repellent, water repellent, and/or stain repellent and comprising a fluorinated polymer dispersed in water or dissolved or dispersed in an organic solvent, the fluorinated polymer comprising units derived from (i) a mixture of two or more fluorinated polyether monomers that differ in at least their molecular weight, the fluorinated polyether monomers having an ethylenically unsaturated group and a perfluorinated polyether group and wherein at least 90% by weight of the mixture consists of fluorinated polyether monomers that have a perfluorinated polyether group having a molecular weight of at least 750 g/mol and (ii) one or more units derived from one or more co-monomers other than a fluorinated polyether monomer and wherein the co-monomers comprise at least one non-fluorinated monomer. Also, method for treating fibrous substrate with such composition, fluorinated polyether monomers, and fluorinated polymers derived from such monomers.

14 Claims, No Drawings

FOREIGN PATENT DOCUMENTS

| | | |
|---|---|---|
| EP | 0 273 449 | 3/1992 |
| EP | 0 537 578 | 10/1992 |
| EP | 622353 A2 * | 4/1994 |
| EP | 0 615 779 | 9/1994 |
| EP | 0 622 353 | 11/1994 |
| EP | 0 665 253 | 8/1995 |
| EP | 0 695 772 | 2/1996 |
| EP | 0 812 891 | 12/1997 |
| EP | 0 870 778 | 10/1998 |
| EP | 1 038 919 | 9/2000 |
| EP | 0 853 638 | 4/2001 |
| EP | 1 116 759 | 7/2003 |
| FR | 1.362.548 | 4/1963 |
| JP | 4146917 | 5/1992 |
| JP | 10081873 | 3/1998 |
| WO | WO 92/17636 | 10/1992 |
| WO | WO 93/22282 | 11/1993 |
| WO | WO 96/31545 | 10/1996 |
| WO | WO 97/44303 | 11/1997 |
| WO | WO 98/51726 | 11/1998 |
| WO | WO 99/16800 | 4/1999 |
| WO | WO 02/14443 | 2/2002 |

OTHER PUBLICATIONS

AATCC Technical Manual/1986, AATCC Test Method 22- 1985, "Water Repellency: Spray Test".

AATCC Technical Manual/1986, AATCC Test Method 118-1983, "Oil Repellency: Hydrocarbon Resistance Test".

AATCC Technical Manual/1986, AATCC Test Method 124-1984, "Appearance of Durable Press Fabrics After Repeated Home Laundering".

3M Protective Material Division's "Stain Release Test I" method (Document # 98-0212-0725-7), May 1999.

U.S. Appl. No. 10/444,415, filed May 23, 2003, Fluorochemical Composition Comprising Perfluoropolyether and an Extender for the Treatment of Fibrous Substrates.

U.S. Appl. No. 10/444,713, filed May 23, 2003, Fluorochemical Composition for Treatment of a Fibrous Substrate.

* cited by examiner

FLUOROCHEMICAL COMPOSITION COMPRISING A FLUORINATED POLYMER AND TREATMENT OF A FIBROUS SUBSTRATE THEREWITH

CROSS REFERENCE TO RELATED APPLICATION

This application claims priority to U.S. Provisional Patent Application No. 60/383,349, filed May 24, 2002.

1. FIELD OF THE INVENTION

The present invention relates to a fluorochemical composition for rendering fibrous substrates oil repellent, water repellent and/or stain repellent. In particular, the present invention relates to fluorochemical compositions that contain a dispersion of a particular fluorinated polymer in water or a dispersion or solution thereof in an organic solvent. The invention further relates to a method of treating the fibrous substrate with the fluorochemical composition. The invention also relates to particular fluorinated polyether monomers and to fluorinated polymers derived therefrom.

2. BACKGROUND

Compositions for making substrates, in particular fibrous substrates, such as textile, oil- and water repellent have been long known in the art. When treating fibrous substrates and in particular textile such as apparel, it is desired that the textile retains its look and feel as much as possible. Therefore, the composition should normally not contain components that would affect the look of the product, i.e., the treatment should be substantially invisible to the unaided human eye. Also the feel of the substrate should preferably be substantially unaffected. Typically this means that only low amounts of the solids of the composition can be applied. Accordingly, an oil- and/or water repellent composition should be highly effective in rendering a substrate repellent.

Commercially available oil- and/or water repellent compositions are typically based on fluorinated compounds that have a perfluorinated aliphatic group. Such compositions are also described in, for example, U.S. Pat. No. 5,276,175 and EP 435 641. The commercial success of this type of compositions can be attributed to their high effectiveness. Fluorinated compounds based on perfluorinated ether moieties have also been described in the prior art for rendering fibrous substrates oil- and/or water repellent. For example, perfluorinated polyether compounds have been disclosed in EP 1 038 919, EP 273 449, JP-A-04-146917, JP-A-10-081873, U.S. Pat. No. 3,536,710, U.S. Pat. No. 3,814,741, U.S. Pat. No. 3,553,179 and U.S. Pat. No. 3,446,761.

U.S. Pat. No. 3,553,179 discloses acrylate type esters of perfluoropolyoxa-alkaneamidoalkyl alcohols and homo- and copolymers derived therefrom and the treatment therewith of fabrics to render the latter oil- and/or water repellent. According to the teaching of this patent, the best results are obtained when the polymer is derived from monomers in which the perfluorinated polyether moiety has a fairly low molecular weight. Such compounds however have the disadvantage that perfluorinated degradation products may form or perfluorinated residuals from the preparation of polymer may be present that have a low molecular weight. These compounds can be present in substantial amounts and may not eliminate quickly from living organisms and are therefore environmentally less desired. Additionally, the examples in this patent indicate that fairly high levels of the fluorinated polymer need to be applied on the fabric and even then, the compositions do not always seem to provide oil repellency properties.

Accordingly, it is a desire to find fluorochemical compositions based on a perfluorinated polyether compound that can provide good to excellent oil- and/or water repellency properties to a fibrous substrate. Preferably, the fluorochemical composition is capable of providing durable oil- and/or water repellency properties to a fibrous substrate such that a treated fibrous substrate can substantially maintain the repellency properties even after several washing cycles. Preferably a fibrous substrate treated with the fluorochemical composition has a soft feel, preferably the feel of a treated fibrous substrate is either the same or softer compared to the untreated fibrous substrate. It is a further desire that the fluorochemical compositions can be easily and efficiently manufactured at a low cost. It is further desired to find compositions that have environmentally beneficial properties.

3. SUMMARY OF THE INVENTION

In accordance with one aspect, the present invention provides a fluorochemical composition comprising a fluorinated polymer dispersed in water or dispersed or dissolved in an organic solvent, said fluorinated polymer comprising units derived from (i) a mixture of two or more fluorinated polyether monomers that differ in at least their molecular weight, said fluorinated polyether monomers having an ethylenically unsaturated group and a perfluorinated polyether group and wherein at least 90% by weight and preferably at least 95% by weight of said mixture consists of fluorinated polyether monomers that have a perfluorinated polyether group having a molecular weight of at least 750 g/mol and (ii) one or more units derived from one or more co-monomers other than a fluorinated polyether monomer and wherein said co-monomers comprise at least one non-fluorinated monomer. The terms "dispersion" and "disperse" as used herein are intended to include dispersion of solids in a liquid as well as liquid in liquid dispersions, which are often called emulsions.

In a further aspect, the present invention also provides a method of treatment of a fibrous substrate with the fluorochemical composition. It has been found that the fluorochemical composition can provide good oil- and/or water repellency properties to the substrate even at low levels of application of for example between 0.1% by weight and 1% by weight based on the weight of the substrate. Additionally, a more environmentally friendly fluorochemical composition can be conveniently manufactured and at a reasonable cost. Indications show that perfluorinated polyether compounds that have a perfluorinated polyether moiety having a molecular weight of at least 750 g/mol and perfluorinated polyether degradation products that may form therefrom would eliminate well from the body of living organisms. In particular compounds having perfluorinated polyether moieties having a molecular weight of at least 750 g/mol and which are based on a polycondensation of hexafluoropropylene oxide would eliminate more easily from the body of living organisms compared to long chain perfluoroaliphatic compounds. Thus, by minimizing the amount of monomers that have low molecular weight fluorinated polyether moieties in the preparation of the fluorinated polymer, environmentally more friendly compositions can be made in a convenient and cost effective way.

In accordance with a further aspect of the present invention there are also provided monomers according to the formula:

$$R^1_f\text{—O—}[CF(CF_3)\text{—}CF_2O]_n\text{—}CF(CF_3)\text{—}Q^2\text{-C(R)}=CH_2 \quad (II)$$

wherein $R^1_f$ represents a perfluorinated alkyl group, n is an integer of 3 to 25, R represents hydrogen or an alkyl group of 1 to 4 carbon atoms, $Q^2$ is a divalent linking group selected from the group consisting of:

$$*\text{—}CH_2\text{-}L^1\text{-} \text{ and } *\text{—}COO\text{-}L^2\text{-},$$

wherein $L^1$ represents a chemical bond or an organic divalent linking group, $L^2$ represents an organic divalent linking group and * indicates the position where the linking group is attached to the perfluorinated polyether group.

In a still further aspect, the present invention provides monomers of the formula:

$$[PF\text{-}L^3\text{-}X^3\text{—}CONH]_{p\text{-}1}\text{-}Z\text{-}NHCOX^4\text{-}L^4\text{-}C(R^b)=CH_2 \quad (III)$$

wherein PF represents a perfluorinated polyether group, $L^3$ and $L^4$ each independently represent a non-fluorinated organic divalent linking group, $X^3$ and $X^4$ independently represent O or $NR^a$ wherein $R^a$ is hydrogen or an alkyl group of 1 to 4 carbon atoms, Z represents a residue of a polyisocyanate having a valence p and wherein p is at least 2, and $R^b$ represents hydrogen or methyl.

In a further aspect of the invention, there are provided fluorinated polymers including homopolymers as well as copolymers that can be prepared from the aforementioned monomers of formula (II) or (III). Fluorochemical compositions of these fluorinated polymers are provided as well and have been found to yield good repellency properties even if no units derived from non-fluorinated monomers are present in the polymer.

4. DETAILED DESCRIPTION OF ILLUSTRATIVE EMBODIMENTS OF THE INVENTION

The fluorinated polyether monomers for the preparation of the fluorinated polymer preferably correspond to the formula:

$$PF\text{-}Q\text{-}C(R)=CH_2 \quad (I)$$

wherein PF represents a perfluorinated polyether group, R is hydrogen or alkyl group of 1 to 4 carbon atoms for example methyl or ethyl and Q represents a non-fluorinated organic divalent linking group. Preferably Q is a divalent linking group selected from the group consisting of:

$$*\text{—}CH_2\text{-}L^1\text{-}, *\text{—}COO\text{-}L^2\text{-}, \text{ and } *\text{—}CONR^a\text{-}L^2\text{-},$$

wherein $L^1$ represents a chemical bond or an organic divalent linking group, $L^2$ represents an organic divalent linking group and $R^a$ is hydrogen or an alkyl group having 1 to 4 carbon atoms and * indicates the position where the linking group is attached to the group PF in formula (I). Examples of organic divalent linking groups $L^1$ include an oxy group, an amido group, a carboxy group, a carbonyl group, an aryl group that may be substituted and an alkylene group that may be substituted and/or that may be interrupted with one or more heteroatoms or with an amido group, a carboxy group, a urethane group or a carbonyl group. Examples of divalent linking groups $L^2$ include an aryl group that may be substituted and an alkylene group that may be substituted and/or that may be interrupted with one or more heteroatoms or with an amido group, a carboxy group, a urethane group or a carbonyl group.

The perfluorinated polyether moiety PF of the fluorinated polyether monomer of formula (I) preferably corresponds to the formula:

$$R^1_f\text{—O—}R^2_f\text{—}(R^3_f)_q\text{—} \quad (Ia)$$

wherein $R^1_f$ represents a perfluorinated alkyl group, $R^2_f$ represents a perfluorinated polyalkyleneoxy group consisting of perfluorinated alkyleneoxy groups having 1, 2, 3 or 4 carbon atoms or a mixture of such perfluorinated alkylene oxy groups, $R^3_f$ represents a perfluorinated alkylene group and q is 0 or 1. The perfluorinated alkyl group $R^1_f$ in the above formula (Ia) may be linear or branched and may comprise 1 to 10 carbon atoms, preferably 1 to 6 carbon atoms. A typical perfluorinated alkyl group is $CF_3\text{—}CF_2\text{—}CF_2\text{—}$. $R^3_f$ is a linear or branched perfluorinated alkylene group that will typically have 1 to 6 carbon atoms. For example, $R^3_f$ is $\text{—}CF_2\text{—}$ or $\text{—}CF(CF_3)\text{—}$. Examples of perfluoroalkylene oxy groups of perfluorinated polyalkyleneoxy group $R^2_f$ include:

—$CF_2$—$CF_2$—O—,
—$CF(CF_3)$—$CF_2$—O—,
—$CF_2$—$CF(CF_3)$—O—,
—$CF_2$—$CF_2$—$CF_2$—O—,
—$CF_2$—O—,
—$CF(CF_3)$—O—, and
—$CF_2$—$CF_2$—$CF_2$—$CF_2$—O.

The perfluoroalkyleneoxy group may be comprised of the same perfluoroalkylene oxy units or of a mixture of different perfluoroalkylene oxy units. When the perfluoroalkyleneoxy group is composed of different perfluoroalkylene oxy units, they can be present in a random configuration, alternating configuration or they can be present as blocks. Typical examples of perfluorinated polyalkylene oxy groups include:

—$[CF_2\text{—}CF_2\text{—}O]_r$—; —$[CF(CF_3)\text{—}CF_2\text{—}O]_n$—;
—$[CF_2CF_2\text{—}O]_i$—$[CF_2O]_j$— and
—$[CF_2\text{—}CF_2\text{—}O]_1$—$[CF(CF_3)\text{—}CF_2\text{—}O]_m$—; wherein r is an integer of 4 to 25, n is an integer of 3 to 25 and i, l, m and j each are integers of 2 to 25. A preferred perfluorinated polyether group that corresponds to formula (Ia) is $CF_3\text{—}CF_2\text{—}CF_2\text{—}O\text{—}[CF(CF_3)\text{—}CF_2O]_n\text{—}CF(CF_3)$— wherein n is an integer of 3 to 25. This perfluorinated polyether group has a molecular weight of 783 when n equals 3 and can be derived from an oligomerization of hexafluoropropylene oxide. This perfluorinated polyether group is preferred because of its benign environmental properties.

Thus, in a particular embodiment of the invention, the fluorinated polyether monomer corresponds to the formula:

$$R^1_f\text{—O—}[CF(CF_3)\text{—}CF_2O]_n\text{—}CF(CF_3)\text{-}Q^2\text{-C(R)}=CH_2 \quad (II)$$

wherein $R^1_f$ represents a perfluorinated alkyl group, n is an integer of 3 to 25, R represents hydrogen or an alkyl group of 1 to 4 carbon atoms, $Q^2$ is a divalent linking group selected from the group consisting of:

$$*\text{—}CH_2\text{-}L^1\text{-} \text{ and } *\text{—}COO\text{-}L^2\text{-},$$

wherein $L^1$ represents a chemical bond or an organic divalent linking group, $L^2$ represents an organic divalent linking group and * indicates the position where the linking group is attached to the perfluorinated polyether group.

Specific examples of fluorinated polyether monomers according to formula (I) or (II) include:

PF—CONR—(CH$_2$)$_m$O—COC(R')=CH$_2$    A.

wherein m is 2, 3, 4, 6, 8, 10, or 11; R is an alkyl group of 1 to 6 carbons; and R' is H or methyl;

PF—COOCH$_2$CH(OH)CH$_2$O—COC(R')=CH$_2$    B.

wherein R' is H or methyl;

PF—CONR—(CH$_2$)$_m$O—CONHCH$_2$CH$_2$—OCO—C(R')=CH$_2$    C.

wherein m is 2, 3, 4, 6, 8, 10, or 11; R is an alkyl group of 1 to 6 carbons; and R' is H or methyl;

PF—CONR—(CH$_2$)$_m$O—CONHCO—C(R')=CH$_2$    D.

wherein m is 2, 3, 4, 6, 8, 10, or 11; R is an alkyl group of 1 to 6 carbons; and R' is H or methyl; and PF—CONR—(CH$_2$)$_m$O—CONHC(Me)$_2$—C$_6$H$_4$—C(Me)=CH$_2$    E.

wherein m is 2, 3, 4, 6, 8, 10, or 11; and R is an alkyl group of 1 to 6 carbons. In the above exemplified compounds, PF has the meaning as defined above and is preferably CF$_3$CF$_2$CF$_2$O—(CF(CF$_3$)CF$_2$O)$_n$CF(CF$_3$)—

The fluorinated polyether compounds of the above formula (I) and (II) can be readily obtained starting from, e.g., acid, ester or acid halide terminated perfluorinated polyether and reacting with an appropriate reactant to introduce the ethylenically unsaturated group and linking group Q or Q$^2$. These reactions are well-known to those skilled in the art and examples of suitable reactions and reactants to introduce the ethylenically unsaturated group and linking group Q or Q$^2$ can be found for example in EP 870 778. For example, the following table lists some -Q-C(R)=CH$_2$ end groups that can be obtained from a reaction of an acid or ester terminated perfluorinated polyether with the indicated reactant:

|   | Reactant |
|---|---|
| —CONHCH$_2$—CH=CH$_2$ | H$_2$NCH$_2$—CH=CH$_2$ |
| —CONH—C$_6$H$_4$—CH$_2$CH=CH$_2$ | H$_2$N—C$_6$H$_4$—CH$_2$CH=CH$_2$ |
| —COOCH$_2$CH=CH$_2$ | CH$_2$=CH—CH$_2$—OH |
| —CH$_2$OCH$_2$CH=CH$_2$ | 1) reduction with LiAlH$_4$ to CH$_2$OH<br>2) CH$_2$=CHCH$_2$Br |
| —CH$_2$OOC—C(CH$_3$)=CH$_2$ | 1) reduction with LiAlH$_4$ to CH$_2$OH<br>2) methacrylol chloride |
| —CH$_2$OOCNH—CH$_2$CH$_2$—OOC—CH=CH$_2$ | 1) reduction with LiAlH$_4$ to CH$_2$OH<br>2) OCN—CH$_2$CH$_2$—OOC—CH=CH$_2$ |

Still further suitable fluorinated monomers include those that correspond to the following general formula (III):

[PF-L$^3$-X$^3$—CONH]$_{p-1}$-Z-NHCOX$^4$-L$^4$-C(R$^b$)=CH$_2$    (III)

wherein PF represents a perfluorinated polyether group preferably having a molecular weight of at least 750 g/mol, e.g., a perfluorinated polyether group as described above, L$^3$ and L$^4$ each independently represent a non-fluorinated organic divalent linking group, X$^3$ and X$^4$ independently represent O or NR$^a$ wherein R$^a$ is hydrogen or an alkyl group of 1 to 4 carbon atoms, Z represents a residue of a polyisocyanate having a valence p and wherein p is at least 2, and R$^b$ represents hydrogen or methyl. Examples of non-fluorinated divalent linking groups L$^3$ include alkylene, arylene, carboxy alkylene, carbonamido alkylene and oxyalkylene. In a particular embodiment, L$^3$ is an organic divalent linking group selected from

*—CH$_2$-L$^1$-, *—COO-L$^2$- and *—CONR$^a$-L$^2$- wherein * denotes the position where the linking group is attached to the perfluorinated polyether group and wherein L$^1$ and L$^2$ are as defined above. Examples of linking groups L$^4$ include alkylene, arylene, alkyleneoxy carbonyl, alkyleneoxy, alkyleneamido. A preferred linking group L$^3$ is carboxyalkylene and a preferred linking group L$^4$ is alkyleneoxy carbonyl. L$^3$ and/or L$^4$ may contain urethane or urylene linkages.

Fluorinated polyether monomers according to formula (III) can be obtained by first condensing a di- or triisocyanate with, respectively, an equimolar or double molar amount of a perfluorinated polyether that has an isocyanate reactive group such as a hydroxy group, thiol or amine in its end-group. This reaction is typically carried out at temperatures between 50 and 80° C., by slow addition of the perfluorinated polyether alcohol, thiol or amine to a solution of the polyisocyanate in an anhydrous organic solvent without zerewitinoff hydrogens, such as ethylacetate or isobutylmethylketone, further containing small amounts of radical inhibitors such as hydroquinone monoalkylethers or phenothiazine (50–200 ppm). Optionally a small amount of a tin or other suitable urethane catalyst can be added to accelerate the reaction. After completion of this first step an equimolar amount of a monofunctional polymerizable compound is added and reacted until all residual isocyanate groups have disappeared. For completion of the second step, sometimes additional catalyst and a slight excess of the polymerizable compound may be required. Preferred polymerizable compounds include acrylates, methacrylates, acrylamides or methacrylamides, that have been functionalized with a hydroxy, carboxyl, amino or thiol group. The condensation reaction may further involve a chain extender such as a diol or a diamine. Examples of chain extenders include alkane diols and alkane diamines.

Examples of polyisocyanates for preparing the monomers of formula (III) include aromatic as well as aliphatic polyisocyanates. Suitable polyisocyanates for the preparation of the blocked polyisocyanate extenders preferably are di- or triisocyanates as well as mixtures thereof. Specific examples are aromatic diisocyanates such as 4,4'-methylenediphenylenediisocyanate, 4,6-di-(trifluoromethyl)-1,3-benzene diisocyanate, 2,4-toluenediisocyanate, 2,6-toluene diisocyanate, o, m, and p-xylylene diisocyanate, 4,4'-diisocyanatodiphenylether, 3,3'-dichloro-4,4'-diisocyanatodiphenylmethane, 4,5'-diphenyldiisocyanate, 4,4'-diisocyanatodibenzyl, 3,3'-dimethoxy-4,4'-diisocyanatodiphenyl, 3,3'-dimethyl-4,4'-diisocyanatodiphenyl, 2,2'-dichloro-5,5'-dimethoxy-4,4'-diisocyanato diphenyl, 1,3-diisocyanatobenzene, 1,2-naphthylene diisocyanate, 4-chloro-1,2-naphthylene diisocyanate, 1,3-naphthylene diisocyanate, and 1,8-dinitro-2,7-naphthylene diisocyanate and aromatic tri-isocyanates such as polymethylenepolyphenylisocyanate.

Still further isocyanates that can be used include alicyclic diisocyanates such as 3-isocyanatomethyl-3,5,5-trimethyl-cyclohexylis aliphatic diisocyanates such as 1,6-hexamethylenediisocyanate, 2,2,4-trimethyl-1,6-hexamethylenediisocyanate, and 1,2-ethylenediisocyanate; aliphatic triisocyanates such as 1,3,6-hexamethylenetriisocyanate; aromatic tri-isocyanates such as polymethylenepolyphenylisocyanate (PAPI); cyclic diisocyanates such as isophorone diisocyanate (IPDI) and dicyclohexylmethane-4,4'-diisocyanate. Also useful are isocyanates containing internal isocyanate-derived moieties such as biuret-containing tri-isocyanates such as that available from Bayer as DESMODUR™ N-100, isocyanurate-containing tri-isocyanates such as that available from Huls AG, Germany, as IPDI-1890, and azetedinedione-containing diisocyanates such as that available from Bayer as DESMODUR™ TT. Also, other di- or tri-isocyanates such as those available from Bayer as DESMODUR™ L and DESMODUR™ W, and tri-(4-isocyanatophenyl)-methane (available from Bayer as DESMODUR™ R) and DDI 1410 from Henkel are suitable.

Examples of fluorinated macromonomers according to formula (III) include the following:

PF—CONR—(CH$_2$)$_m$O—CONH—(CH$_2$)$_6$—NHCO(O(CH$_2$)$_p$)$_q$OCOC(R')=CH$_2$ wherein m is 2, 3, 4, 6, 8, 10, or 11; p is 2, 3 or 4; q is 1–20; R is an alkyl group of 1 to 6 carbons; and R' is H or methyl;

PF—CONR—(CH$_2$)$_m$O—CONH—CH$_2$C(Me)$_2$CH$_2$CH(Me)CH$_2$CH$_2$—NHCO(O(CH$_2$)$_p$)$_q$O-COC(R')=CH$_2$ wherein m is 2, 3, 4, 6, 8, 10, or 11; p is 2, 3 or 4; q is 1–20; R is an alkyl group of 1 to 6 carbons; and R' is H or Me;

PF—CONR—(CH$_2$)$_m$O—CONHC$_6$H$_{10}$—CH$_2$—C$_6$H$_{10}$—NHCO(O(CH$_2$)$_p$)$_q$OCOC(R')=CH$_2$ wherein m is 2, 3, 4, 6, 8, 10, or 11; p is 2, 3 or 4; q is 1–20; R is an alkyl group of 1 to 6 carbons; and R' is H or Me;

PF—CONR—(CH$_2$)$_m$O—CONH—C$_6$H$_7$—(CH$_3$)$_3$—CH$_2$—NHCO(O(CH$_2$)$_p$)$_q$OCOC(R')=CH$_2$ wherein m is 2, 3, 4, 6, 8, 10, or 11; p is 2, 3 or 4; q is 1–20; R is an alkyl group of 1 to 6 carbons; and R' is H or Me;

PF—CONR—(CH$_2$)$_m$O—CONH—C$_6$H$_{10}$—NHCO(O(CH$_2$)$_p$)$_q$OCOC(R')=CH$_2$ wherein m is 2, 3, 4, 6, 8, 10, or 11; p is 2, 3 or 4; q is 1–20; R is an alkyl group of 1 to 6 carbons; and R': H or Me;

PF—CONR—(CH$_2$)$_m$O—CONH—(CH$_2$)$_6$—NHCOCH$_2$CH$_2$OCOCH=CH$_2$ wherein m is 2, 3, 4, 6, 8, 10, or 11; and R is an alkyl group of 1 to 6 carbons;

PF—CONR—(CH$_2$)$_m$O—CONH—(CH$_2$)$_6$—NHCOOCH$_2$NCOCR'=CH$_2$ wherein m is 2, 3, 4, 6, 8, 10, or 11; R is an alkyl group of 1 to 6 carbons; and R' is H or Me; and PF—CONR—(CH$_2$)$_m$O—CONH—(CH$_2$)$_6$—NH-COOCH(CH$_2$Cl)CH$_2$OCOCR'=CH$_2$ wherein m is 2, 3, 4, 6, 8, 10, or 11; R is methyl, ethyl, propyl, butyl, or hexyl; and R' is H or Me.

In the above listed examples, PF has the meaning as defined above and is preferably CF$_3$CF$_2$CF$_2$O—(CF(CF$_3$)CF$_2$O)$_n$CF(CF$_3$)— and Me represents methyl.

In one aspect of the invention to prepare the fluorinated polymer of the fluorochemical composition, a mixture of two or more fluorinated polyether monomers, typically a mixture of fluorinated polyether monomers that differ in molecular weight, is copolymerized with one or more co-monomers, at least one of which is a non-fluorinated monomer. Non-fluorinated monomers include for example a hydrocarbon group containing monomer such as monomers that can be represented by formula:

$$R_h\text{-L-Z} \qquad \text{(IV)}$$

wherein $R_h$ represents an aliphatic group having 4 to 30 carbon atoms, L represents an organic divalent linking group and Z represents an ethylenically unsaturated group. The hydrocarbon group is preferably selected from the group consisting of a linear, branched or cyclic alkyl group, an aralkyl group, an alkylaryl group and an aryl group. Further non-fluorinated monomers include those wherein the hydrocarbon group in formula (IV) includes oxyalkylene groups, is interrupted with one or more heteroatoms and/or contains substituents, such as hydroxy groups, amino groups and/or cure sites. The term cure sites includes functional groups that are capable of engaging in a reaction with the substrate to be treated. Examples of cure sites include acid groups such as carboxylic acid groups, hydroxy groups, amino groups and isocyanate groups or blocked isocyanate groups. A preferred cure site is a blocked isocyanate group or an isocyanate group. The linking group L is for example a carboxy group, a carbonamido group or an oxy group.

Examples of non-fluorinated comonomers include hydrocarbon esters of an α,β-ethylenically unsaturated carboxylic acid. Examples include n-butyl(meth)acrylate, isobutyl (meth)acrylate, octadecyl(meth)acrylate, lauryl(meth)acrylate, cyclohexyl (meth)acrylate, cyclodecyl (meth)acrylate, isobornyl (meth)acrylate, phenyl (meth)acrylate, benzyl (meth)acrylate, adamantyl (meth)acrylate, tolyl (meth)acrylate, 3,3-dimethylbutyl (meth)acrylate, (2,2-dimethyl-1-methyl)propyl (meth)acrylate, cyclopentyl (meth)acrylate, 2-ethylhexyl (meth)acrylate, t-butyl (meth)acrylate, cetyl (meth)acrylate, stearyl (meth)acrylate, behenyl (meth)acrylate, isooctyl (meth)acrylate, n-octyl (meth)acrylate, 4-ethyl-cyclohexyl (meth)acrylate, 2-ethoxyethyl methacrylate and tetrahydropyranyl acrylate. Further non-fluorinated comonomers include allyl esters such as allyl acetate and allyl heptanoate; alkyl vinyl ethers or alkyl allyl ethers such as cetyl vinyl ether, dodecylvinyl ether, ethylvinyl ether; unsaturated acids such as acrylic acid, methacrylic acid, alpha-chloro acrylic acid, crotonic acid, maleic acid, fumaric acid, itaconic acid and their anhydrides and their esters such as vinyl, allyl, methyl, butyl, isobutyl, hexyl, heptyl, 2-ethylhexyl, cyclohexyl, lauryl, stearyl, isobornyl or alkoxy ethyl acrylates and methacrylates; alpha-beta unsaturated nitriles such as acrylonitrile, methacrylonitrile, 2-chloroacrylonitrile, 2-cyanoethyl acrylate, alkyl cyanoacrylates; alpha,beta-unsaturated carboxylic acid derivatives such as allyl alcohol, allyl glycolate, acrylamide, methacrylamide, n-diisopropyl acrylamide, diacetoneacrylamide, aminoalkyl (meth)acrylates such as N,N-diethylaminoethylmethacrylate, N-t-butylaminoethylmethacrylate; alkyl(meth)acrylates having an ammonium group such as (meth)acrylates of the formula $X^-R_3N^+\!-\!R^e\!-\!OC(O)\!-\!CR^f\!\!=\!\!CH_2$ wherein $X^-$ represents an anion such as, e.g., a chloride anion, R represents hydrogen or an alkyl group and each R may the same of different, $R^e$ represents an alkylene and $R^f$ represents hydrogen or methyl; styrene and its derivatives such as vinyltoluene, alpha-methylstyrene, alpha-cyanomethyl styrene; lower olefinic hydrocarbons which can contain halogen such as ethylene, propylene, isobutene, 3-chloro-1-isobutene, butadiene, isoprene, chloro and dichlorobutadiene and 2,5-dimethyl-1,5-hexadiene, hydrocarbon monomers comprising (poly)oxyalkylene groups including (meth)acrylates of a polyethylene glycol, (meth)acrylates of a block copolymer of ethylene oxide and propylene oxide, (meth)acrylates of amino- or diamino terminated polyethers and (meth)acrylates of methoxypolyethyleneglycols and hydrocarbon monomers comprising a hydroxyl group include hydroxylgroup containing (meth)acrylates, such as hydroxyethyl(meth)acrylate and hydroxypropyl(meth)acrylate. Preferably, the non-fluorinated comonomer(s) will comprise one or more chlorine containing monomers such as vinyl chloride and vinylidene chloride.

In a particular embodiment of the invention, the fluorinated polymer includes units having one or more cure sites. These units will typically derive from corresponding co-monomers that include one or more cure sites. Examples of co-monomers from which a cure site unit may derive include (meth)acrylic acid, maleic acid, maleic anhydride, allyl methacrylate, hydroxybutyl vinyl ether, N-hydroxymethyl (meth)acrylamide, N-methoxymethyl acrylamide, N-butoxymethyl acrylamide, N-isobutoxymethyl acrylamide, glycidylmethacrylate and α,αdimethyl-m-isopropenylbenzyl isocyanate [α,α dimethyl m. isopropenyl benzyl isocyanate]. Other examples include polymerizable urethanes, that can be obtained by the reaction of a polymerizable mono-isocyanate with an isocyanate blocking agent or by the reaction of a di- or poly-isocyanate and a hydroxy or amino-functionalized acrylate or methacrylate and an isocyanate blocking agent.

The fluorinated polymer may also comprise units that derive from fluorinated co-monomers other than fluorinated polyether monomers. Such additional fluorinated monomers are preferably short chain perfluoroaliphatic containing monomers. Preferably, fluorinated co-monomers that may be used in preparing the fluorinated polymer of the fluorochemical composition include those of the following formula:

$$R_f^4\text{-}Q^3\text{-}C(R^e)\!\!=\!\!CH_2 \quad (V)$$

wherein $R_f^4$ is a perfluoroaliphatic group of 3 to 5 or 6 carbon atoms, preferably $C_4F_9\!-\!$, $R^e$ is hydrogen or a lower alkyl of 1 to 4 carbon atoms and $Q^3$ represents a non-fluorinated organic divalent linking group. The linking group $Q^3$ links the perfluoroaliphatic group to the free radical polymerizable group. Linking group $Q^3$ is generally non-fluorinated and preferably contains from 1 to about 20 carbon atoms. $Q^3$ can optionally contain oxygen, nitrogen, or sulfur-containing groups or a combination thereof, and $Q^3$ is free of functional groups that substantially interfere with free-radical polymerization (e.g., polymerizable olefinic double bonds, thiols, and other such functionality known to those skilled in the art). Examples of suitable linking groups $Q^3$ include straight chain, branched chain or cyclic alkylene, arylene, aralkylene, sulfonyl, sulfoxy, sulfonamido, carbonamido, carbonyloxy, urethanylene, ureylene, and combinations thereof such as sulfonamidoalkylene.

Specific examples of fluorinated aliphatic group containing monomers include:

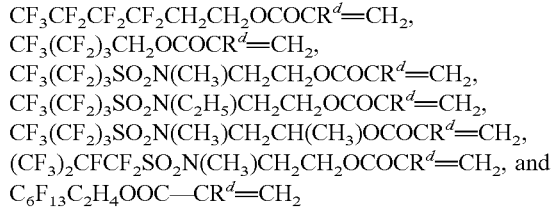

$CF_3CF_2CF_2CF_2CH_2CH_2OCOCR^d\!\!=\!\!CH_2$,
$CF_3(CF_2)_3CH_2OCOCR^d\!\!=\!\!CH_2$,
$CF_3(CF_2)_3SO_2N(CH_3)CH_2CH_2OCOCR^d\!\!=\!\!CH_2$,
$CF_3(CF_2)_3SO_2N(C_2H_5)CH_2CH_2OCOCR^d\!\!=\!\!CH_2$,
$CF_3(CF_2)_3SO_2N(CH_3)CH_2CH(CH_3)OCOCR^d\!\!=\!\!CH_2$,
$(CF_3)_2CFCF_2SO_2N(CH_3)CH_2CH_2OCOCR^d\!\!=\!\!CH_2$, and
$C_6F_{13}C_2H_4OOC\!-\!CR^d\!\!=\!\!CH_2$ wherein $R^d$ is hydrogen or methyl.

In the above described aspect of the invention, the fluorinated polymer is a copolymer that typically comprises between 5 and 95% by weight of units deriving from the fluorinated polyether monomer and between 95 and 5% by weight of units deriving from one or more co-monomers that comprise at least one non-fluorinated monomer. More preferably, the fluorinated polymer will comprise between 10% by weight and 75% by weight of units deriving from the fluorinated polyether monomer and between 90% and 25% by weight of units deriving from non-fluorinated monomers and optional fluorinated monomers other than the fluorinated polyether monomer. In a particular preferred embodiment, the fluorinated polymer will comprise from 5 to 70% by weight of units deriving from the fluorinated polyether monomer, between 1 and 30% by weight of monomers comprising a cure site and between 0 and 94% by weight of other non-fluorinated monomers and/or other fluorinated monomers.

In accordance with another aspect of the present invention, the fluorinated polymer of the fluorochemical composition may be a fluorinated polymer that comprises one or more units that are derived from a monomer according to formula (II) or (III) and optionally one or more further units derived from comonomers described above including non-fluorinated and/or fluorinated comonomers described above. Thus, in accordance with this aspect of the invention, the fluorinated polymer can be a homopolymer of a monomer of formula (II) or (III), a polymer of a mixture of monomers according to formula (II) or (III) that differ in their molecular weight and of which preferably at least 90% by weight has a perfluorinated polyether group of a molecular weight of at least 750 g/mol, or a copolymer of one or more monomers of formula (II) or (III) and a co-monomer at least one of which is a non-fluorinated monomer.

The fluorinated polymer is typically prepared by free radical polymerisation e.g. by solution or mini-emulsion polymerisation techniques. Various surfactants such as anionic, cationic, non-ionic or amphoteric surfactants may be employed. They can be used alone or in combination. Alternatively, the polymerisation may be done in solvent. The polymerisation can be a thermal or photochemical polymerisation, carried out in the presence of a free radical initiator. Useful free radical initiators are known in the art and include azo compounds, such as azobisisobutyronitrile (AIBN), azobisvaleronitrile and azobis(2-cyanovaleric acid), 2,2'-azobis(2-amidinopropane)dihydrochloride and the like, hydroperoxides such as cumene, t-butyl, and t-amyl hydroperoxide, dialkyl peroxides such as di-t-butyl and dicumylperoxide, peroxyesters such as t-butylperbenzoate and di-t-butylperoxy phthalate, diacylperoxides such as benzoyl peroxide and lauroyl peroxide.

The polymerisation may further be carried out in the presence of a chain transfer agent or a chain terminator to tailor the molecular weight and/or properties of the fluorochemical polymer. Typically, the fluorinated polymer has a weight average molecular weight between 5000 and 300 000, preferably between 5000 and 100 000.

The fluorochemical composition comprises a dispersion of the fluorinated polymer in water or a dispersion or solution in an organic solvent. Generally, the amount of fluorinated polymer contained in the treating composition is between 0.01 and 4% by weight, preferably between 0.05 and 3% by weight based on the total weight of the fluorochemical composition. Higher amounts of fluorinated polymer of more than 4% by weight, for example up to 10% by weight may be used as well, particularly if the uptake of the fluorochemical composition by the substrate is low. Generally, the fluorochemical treating composition will be prepared by diluting a more concentrated fluorochemical composition to the desired level of fluorinated polymer in the treating composition. The concentrated fluorochemical composition can contain the fluorinated polymer in an amount of up to 70% by weight, typically between 10% by weight and 50% by weight.

The weight average particle size of the fluorinated polymer particles in an aqueous or solvent dispersion is preferably not more than 400 nm, more preferably is not more than 300 nm. A typical range is from 50 nm to 400 nm.

An aqueous dispersion of the fluorinated polymer may be non-ionic, anionic, cationic or zwitterionic. The dispersion is preferably stabilised using non-fluorinated surfactants, such as non-ionic polyoxyalkylene, in particular polyoxyethylene surfactants, anionic non-fluorinated surfactants, cationic non-fluorinated surfactants and zwitterionic non-fluorinated surfactants. Specific examples of non-fluorinated surfactants that can be used are nonionic types such as Emulsogen EPN 207 (Clariant) and Tween 80 (ICI), anionic types such as lauryl sulfate and sodium dodecyl benzene sulfonate, cationic types such as Arquad T-50 (Akzo), Ethoquad 18–25 (Akzo) or amphoteric types such as lauryl amineoxide and cocamido propyl betaine. The non-fluorinated surfactant is preferably present in an amount of about 1 to about 25 parts by weight, preferably about 2 to about 10 parts by weight, based on 100 parts by weight of the fluorochemical composition.

Alternatively, a dispersion or solution of the fluorinated polymer in an organic solvent can be used as the fluorochemical treating composition. Suitable organic solvents include alcohols such as isopropanol, methoxy propanol and t.butanol, ketones such as isobutyl methyl ketone and methyl ethylketone, ethers such as isopropylether, esters such ethylacetate, butylacetate or methoxypropanol acetate or (partially) fluorinated solvents such as HCFC-141b, HFC-4310 mee and hydrofluoroethers such as HFE-7100 or HFE-7200 available from 3M Company.

The fluorochemical composition may contain further additives such as buffering agent, agents to impart fire proofing or antistatic properties, fungicidal agents, optical bleaching agents, sequestering agents, mineral salts and swelling agents to promote penetration. In a particular embodiment, the fluorochemical composition may contain additionally a non-fluorinated organic compound, wherein the non-fluorinated organic compound is capable of improving relative to the fluorochemical composition without the non-fluorinated organic compound, the oil repellency or water repellency that can be achieved by the fluorochemical composition on a fibrous substrate or the durability of one or both of the repellency properties. Such non-fluorinated organic compounds are sometimes called extenders. Suitable extenders for use in the fluorochemical composition include non-fluorinated organic compounds that have one or more blocked isocyanate groups, so called blocked isocyanate compounds, or a carbodiimide compound. Preferred blocked isocyanate extenders are blocked polyisocyanates that at a temperature of less than 150° C. are capable of reacting with an isocyanate reactive group, preferably through deblocking of the blocking agent at elevated temperature. Blocked isocyanate extenders can be obtained from a reaction of an isocyanate component with a isocyanate blocking agent. Preferred blocking agents include arylalcohols such as phenols, lactams such as ε-caprolactam, δ-valerolactam, γ-butyrolactam, oximes such as formaldoxime, acetaldoxime, methyl ethyl ketone oxime, cyclohexanone oxime, acetophenone oxime, benzophenone oxime, 2-butanone oxime or diethyl glyoxime. Further suitable blocking agents include bisulfite and triazoles.

According to a particular embodiment of the invention, the blocked polyisocyanate may comprise the condensation product of a polyisocyanate, for example, a di- or triisocyanate, a blocking agent, and a non-fluorinated organic compound other than the blocking agent and having one or more isocyanate reactive groups such as a hydroxy, amino, or thiol group.

The carbodiimide compound can be an aromatic or aliphatic carbodiimide compound and may include a polycarbodiimide. Carbodiimides that can be used have been described in for, example, U.S. Pat. No. 4,668,726, U.S. Pat. No. 4,215,205, U.S. Pat. No. 4,024,178, U.S. Pat. No. 3,896,251, WO 93/22282, U.S. Pat. No. 5,132,028, U.S. Pat. No. 5,817,249, U.S. Pat. No. 4,977,219, U.S. Pat. No. 4,587,301, U.S. Pat. No. 4,487,964, U.S. Pat. No. 3,755,242 and U.S. Pat. No. 3,450,562. Particularly suitable carbodiimides for use in this invention include those corresponding to the formula:

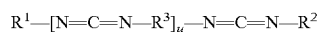

$$R^1-[N=C=N-R^3]_u-N=C=N-R^2$$

wherein u has a value of 1 to 20, typically 1 or 2, $R^1$ and $R^2$ each independently represent a hydrocarbon group, in particular a linear, branched or cyclic aliphatic group preferably having 6 to 18 carbon atoms and $R^3$ represents a divalent linear, branched or cyclic aliphatic group.

The aliphatic carbodiimide extenders can be synthesized in a 1-step process by reacting aliphatic diisocyanates with an aliphatic mono-isocyanate as a chain stopper at 130 to 170° C. in the presence of a phospholine oxide or other suitable carbodiimide formation catalyst. Preferably the reaction is carried out in the absence of solvents under inert atmosphere, but high-boiling non-reactive solvents such as methyl isobutyl ketone can be added as diluents. The mole ratio of diisocyanate to mono-isocyanate can be varied from 0.5 to 10, preferably 1 to 5.

Examples of aliphatic diisocyanates for the preparation of the carbodiimide compounds include isophorone diisocyanate, dimer diacid diisocyanate, 4,4' dicyclohexyl methane diisocyanate. Examples of mono-isocyanates are n.butyl isocyanate and octadecyl isocyanate. Representative examples of suitable carbodiimide formation catalysts are described in, e.g., U.S. Pat. No. 2,941,988, U.S. Pat. No. 3,862,989 and U.S. Pat. No. 3,896,251. Examples include 1-ethyl-3-phospholine, 1-ethyl-3-methyl-3-phospholine-1-oxide, 3-methyl-1-phenyl-3-phospholine-1-oxide and bicyclic terpene alkyl or hydrocarbyl aryl phosphine oxide. The particular amount of catalyst used depends on the reactivity of the catalyst and the isocyanates being used. A concentration of 0.2 to 5 parts of catalyst per 100 g of diisocyanate is suitable.

In an alternative approach the aliphatic diisocyanates can be first reacted with monofunctional alcohols, amines or thiols followed by carbodiimide formation in a second step.

The fluorochemical composition may contain also further fluorochemical compounds other than the fluorinated polymer. For example, the fluorochemical composition may contain fluorochemical compounds that are based on or derived from perfluoroaliphatic compounds. Nevertheless, it is not necessary to include such compounds in the fluorochemical composition. Also, if perfluoroaliphatic based compounds are included in the composition, they are preferably compounds based on short chain perfluoroaliphatics having not more than 5 or 6 carbon atoms such as compounds containing $C_4F_9$— groups.

In a preferred embodiment of the present invention, the fluorochemical composition will be free of or substantially free of perfluorinated polyether moieties having a molecular weight of less than 750 g/mol and/or perfluoroaliphatic groups of more than 5 or 6 carbons. By the term "perfluoroaliphatic groups" is meant groups consisting of carbon and fluorine without including perfluorinated end groups of the perfluorinated polyether moieties. By the term "substantially free of" is meant that the particular perfluorinated polyether moieties are present in amounts of not more than 10% by weight, preferably not more than 5% by weight and most preferably not more than 1% by weight based on the total weight of perfluorinated polyether moieties in the composition and that the particular perfluoroaliphatic groups having more than 5 or 6 carbons are present in amounts of not more than 10% by weight, preferably not more than 5% by weight and most preferably not more than 1% by weight based on the total weight of perfluoroaliphatic groups in the composition. Compositions that are free of or substantially free of these moieties or groups are preferred because of their beneficial environmental properties.

In order to affect treatment of the fibrous substrate the fibrous substrate is contacted with the fluorochemical composition. For example, the substrate can be immersed in the fluorochemical treating composition. The treated substrate can then be run through a padder/roller to remove excess fluorochemical composition and dried. The treated substrate may be dried at room temperature by leaving it in air or may alternatively or additionally be subjected to a heat treatment, for example, in an oven. This heat treatment is typically carried out at temperatures between about 50° C. and about 190° C. depending on the particular system or application method used. In general, a temperature of about 120° C. to 170° C., in particular of about 150° C. to about 170° C. for a period of about 20 seconds to 10 minutes, preferably 3 to 5 minutes, is suitable. Alternatively, the chemical composition can be applied by spraying the composition on the fibrous substrate.

It was found that with fluorochemical compositions of this invention, good to excellent oil- and/or water repellent properties on the fibrous substrate can be achieved. Moreover, these properties can be achieved without subjecting the fibrous substrate to a heat treatment, i.e. the properties can be achieved upon air drying the fibrous substrate after the application of the composition. Also, it was observed that the repellency properties are durable, i.e., even after several washing or dry cleaning cycles, the repellency properties can be substantially maintained. The compositions furthermore in many instances do not negatively affect the soft feel of the fibrous substrates or may even improve the soft feel of the fibrous substrate.

The amount of the treating composition applied to the fibrous substrate is chosen so that a sufficiently high level of the desired properties are imparted to the substrate surface preferably without substantially affecting the look and feel of the treated substrate. Such amount is usually such that the resulting amount of the fluoropolymer on the treated fibrous substrate will be between 0.05% and 3% by weight, preferably between 0.2 and 1% by weight based on the weight of the fibrous substrate. The amount which is sufficient to impart desired properties can be determined empirically and can be increased as necessary or desired. According to a particularly preferred embodiment, the treatment is carried out with a composition and under conditions such that the total amount of perfluorinated polyether groups having a molecular weight of less than 750 g/mol and/or perfluoroaliphatic groups of more than 6 carbon atoms is not more than 0.1%, preferably not more than 0.05% by weight based on the weight of the fibrous substrate.

Fibrous substrates that can be treated with the fluorochemical composition include in particular textile or carpet. The fibrous substrate may be based on synthetic fibers, e.g. polyester, polyamide and polyacrylate fibers or natural fibers, e.g. cellulose fibers as well as mixtures thereof. The fibrous substrate may be a woven as well as a non-woven substrate.

The invention will now be further illustrated with reference to the following examples without the intention to limit the invention thereto. All parts and percentages are by weight unless stated otherwise.

EXAMPLES

Formulation and Treatment Procedure:

Treatment baths were formulated containing a defined amount of the fluorochemical polymer. Treatments were applied to the test substrates by padding to provide a concentration as indicated in the examples (based on fabric weight and indicated as SOF (solids on fabric)). Samples were air dried at ambient temperature for 24–48 hours followed by conditioning at 21° C. and 50% relative humidity for 2 hours (air cure). Alternatively, the samples were dried and cured at 160° C. during 1.5 minutes or at 150° C. during 10 minutes, as indicated in the examples.

After drying and heat cure, the substrates were tested for their repellency properties.

Substrates used for the evaluation of treatments of this invention were commercially available and are listed below:

IND: "Imported Nexday Twill" 100% ring spun cotton, dyed unfinished from Avondale mills in Graniteville S.C., USA;

SHIPP: "Super Hippagator" 100% ring/OE spun cotton, dyed unfinished from Avondale Mills in Graniteville S.C., USA;

PES/CO (2681.4): polyester/cotton 65/35 fabric, style no. 2681.4, available from Utexbel N.V., Ronse, Belgium;

PAμ (7819.4): 100% polyamide microfiber, style no. 7819.4, available from Sofinal, Belgium;

Co (1511.1): 100% cotton: bleached, mercerized cotton poplin, style no. 1511.1, available from Utexbel N.V., Ronse, Belgium; and PESμ (6145.3): 100% polyester microfiber, style no. 6145.3, available from Sofinal, Belgium.

Respective data of water and oil repellency shown in the Examples and Comparative Examples were based on the following methods of measurement and evaluation criteria:

Spray Rating (SR)

The spray rating of a treated substrate is a value indicative of the dynamic repellency of the treated substrate to water that impinges on the treated substrate. The repellency was measured by Standard Test Number 22, published in the 1985 Technical Manual and Yearbook of the American Association of Textile Chemists and Colorists (AATCC), and was expressed in terms of 'spray rating' of the tested substrate. The spray rating was obtained by spraying 250 ml water on the substrate from a height of 15 cm. The wetting pattern was visually rated: using a 0 to 100 scale, where 0 means complete wetting and 100 means no wetting at all.

Water Repellency Test (WR)

The water repellency (WR) of a substrate was measured using a series of water-isopropyl alcohol test liquids and was expressed in terms of the "WR" rating of the treated substrate. The WR rating corresponded to the most penetrating test liquid that did not penetrate or wet the substrate surface after 10 seconds exposure. Substrates which were penetrated by 100% water (0% isopropyl alcohol), the least penetrating test liquid, were given a rating of 0; substrates resistant to 100% water were given a rating W and substrates resistant to 100% isopropyl alcohol (0% water), the most penetrating test liquid, were given a rating of 10. Other intermediate ratings were calculated by dividing the percent isopropylalcohol in the test liquid by 10, e.g., a treated substrate resistant to a 70%/30% isopropyl alcohol/water blend, but not to an 80%/20% blend, would be given a rating of 7.

Oil Repellency (OR)

The oil repellency of a substrate was measured by the American Association of Textile Chemists and Colorists (AATCC) Standard Test Method No. 118-1983, which test was based on the resistance of a treated substrate to penetration by oils of varying surface tensions. Treated substrates resistant only to Nujol® mineral oil (the least penetrating of the test oils) were given a rating of 1, whereas treated substrates resistant to heptane (the most penetrating of the test liquids) were given a rating of 8. Other intermediate values were determined by use of other pure oils or mixtures of oils, as shown in the following table.

Standard Test Liquids

| AATCC Oil Repellency Rating Number | Compositions |
| --- | --- |
| 1 | Nujol ® |
| 2 | Nujol ®/n-Hexadecane 65/35 |
| 3 | n-Hexadecane |
| 4 | n-Tetradecane |
| 5 | n-Dodecane |
| 6 | n-Decane |
| 7 | n-Octane |
| 8 | n-Heptane |

Glossary

| Descriptor | Structure/Formula | Availability |
| --- | --- | --- |
| AIBN | Azobisisobutyronitrile | Sigma-Aldrich, Milwaukee, WI |
| DBTDL | Dibutyl tin dilaurate | Sigma-Aldrich |
| DMAEMA | Dimethylamino ethylmethacrylate | Sigma-Aldrich |

-continued

Glossary

| Descriptor | Structure/Formula | Availability |
| --- | --- | --- |
| Ethoquad ™ 18/25 | Methyl polyoxyethylene(15)octadecyl ammonium chloride | Akzo, Arnhem, Netherlands |
| FZ-800 | condensation product of HEMA/IPDI/MEKO (1/1/1) | |
| HEMA | Hydroxyethyl methacrylate | Sigma-Aldrich |
| HFE-7100 | Perfluorobutyl methyl ether | 3M, St Paul, MN |
| IPDI | Isophorone diisocyanate | Merck KGaA, Germany |
| MEHQ | Hydroquinone monomethyl ether | |
| MEK | Methyl ethyl ketone | Sigma-Aldrich |
| ODMA | Octadecyl methacrylate | Sigma-Aldrich |
| VCl$_2$ | Vinylidene Chloride | Sigma-Aldrich |
| V-59 | 2,2'-azobis(2-methyl butyronitrile) | Wako |

(HFPO)$_k$-alc: HFPO oligomer alcohols, $CF_3CF_2CF_2$—O—$(CF(CF_3)CF_2O)_n CF(CF_3)CONHCH_2CH_2OH$, consisting of a mixture of oligomers with different chain lengths. The indexes k and n are indicative of the mathematical average of the number of repeating HFPO-units and k=n+2. The percentage of oligomeric alcohols with a fluorinated polyether group having a molecular weight lower than 750 g/mol was 3.2% for (HFPO)$_{11.5}$-alc and 5.7% for (HFPO)$_{8.8}$-alc.

(HFPO)$_k$-methacrylate:
$CF_3CF_2CF_2$—O—$(CF(CF_3)CF_2O)_n CF(CF_3)$ $CONHCH_2CH_2O_2CC(Me)$=$CH_2$, with k and n indicative of degree of oligomerization and k=n+2

All parts, ratios, percentages etc. in the following examples are by weight unless otherwise noted.

Synthesis of Fluorochemical Macromers

1. Synthesis of HFPO-oligomer Alcohol ((HFPO)$_k$-alc)

HFPO-oligomer alcohols $CF_3CF_2CF_2$—O—$(CF(CF_3)CF_2O)_n CF(CF_3)$ $CONHCH_2CH_2OH$, indicated as (HFPO)$_k$-alc, were made according to the procedure for the synthesis of (HFPO)$_{8.8}$-alc.

A 1 liter 3-necked reaction flask was equipped with a stirrer, a condenser, a dropping funnel, a heating mantle and a thermometer. The flask was charged with 1000 g $CF_3CF_2CF_2$—O—$(CF(CF_3)CF_2O)_{6.8} CF(CF_3)COOCH_3$. The mixture was heated to 40° C. and 43.4 g ethanolamine was added via the dropping funnel, over a period of 30 minutes. The reaction mixture was kept at 65° C. during 3 hours. FTIR analysis indicated complete conversion. The end product could be purified as follows: 500 ml ethyl acetate were added and the organic solution was washed with 200 ml HCL (1N), followed by 2 washings with 200 ml brine. The organic phase was dried over MgSO$_4$. Ethyl acetate was evaporated with waterjet vacuum, using a Büchi rotavapor. The product was dried at 50° C. during 5 hours, using oil pump vacuum (<1mbar). An alternative purification step includes evaporation of methanol, formed during reaction, via water jet vacuum, using a Büchi rotavapor (up to 75° C.=<100 mm Hg). Residual methanol was further removed with oil pump vacuum (up to 80° C.,=<10 mbar).

The HFPO-oligomer alcohol (HFPO)$_{8.8}$-alc obtained, was a yellow coloured oil, with medium viscosity. The structure was confirmed by means of NMR. The HFPO-oligomer alcohol (HFPO)$_{11.5}$-alc was made following the same procedure.

2. Synthesis of (HFPO)$_k$-methacrylate

The (HFPO)$_{11.5}$-methacrylate CF$_3$CF$_2$CF$_2$—O—(CF(CF$_3$)CF$_2$O)$_{9.5}$CF(CF$_3$)CONHCH$_2$CH$_2$O$_2$CC(Me)=CH$_2$ was made starting from the corresponding (HFPO)$_{11.5}$-alc CF$_3$CF$_2$CF$_2$—O—(CF(CF$_3$)CF$_2$O)$_{9.5}$CF(CF$_3$)CONHCH$_2$CH$_2$OH, with M$_w$ 1926. 725.2 g (HFPO)$_{11.5}$-alc were placed in a 2 liter three-necked round bottom flask, equipped with a condenser, a stirrer, a nitrogen inlet and a temperature control. 64.4 g methacrylic anhydride and 280 ml HFE 7100 were added. The mixture was stirred until the reagents were dissolved. 1 g concentrated sulfuric acid was added. An exothermic reaction was noted. The reaction was stirred at room temperature overnight after the exotherm had subsided. 1000 ml DI water were added. The mixture was shaken. After the emulsion had been allowed to separate overnight, the organic phase was separated and the solvent was removed under reduced pressure. IR analysis and gas chromatography confirmed the formation of the methacrylate ester.

(HFPO)$_{8.8}$-methacrylate was made according to the same procedure and starting from the corresponding (HFPO)$_{8.8}$-alcohol.

3. Synthesis of (HFPO)$_{\sim 8.8}$-alc/IPDI/HEMA

A 250 ml 3-necked reaction flask, equipped with condenser, stirrer, dropping funnel, temperature control and nitrogen inlet was charged with 11.1 gram IPDI. A solution of 75.3 g (HFPO)$_{8.8}$-alcohol, 23 mg Sn(octanoate)$_2$, 14 mg phenothiazine and 14 mg MEHQ in 31 g dry acetone was added over 1 hr via dropping funnel, while heating at 55° C. The reaction was continued at 55° C. for 4 hrs, followed by addition of 7.8 g HEMA over 3 hrs via dropping funnel. The reaction was continued overnight to obtain a clear, yellowish 75% solution. Completion of the reaction was confirmed by disappearance of the NCO absorptions in the FT-IR spectrum.

4. Synthesis of Fluorochemical Macromers (co)polymers FM-1 to FM-4

100 ml polymerization bottles were charged with 75% fluorochemical (HFPO)$_{8.8}$-alc/IPDI/HEMA solution, comonomers and ethylacetate in amounts as indicated in the table, followed by 0.15 g V-59 initiator. The polymerization bottles were degassed using water jet vacuum, purged with nitrogen atmosphere and sealed. For FM-3 and FM-4, VCl$_2$ was added after degassing and purging with nitrogen. Polymerization was carried out overnight in a Launder-o-meter at 75° C. An additional 0.075 g V-59 was then charged and the reaction continued for 6 hrs. All examples gave semi-viscous polymer solutions.

| Polymer | g (HFPO)$_{8.8}$-alc/IPDI/HEMA | g ODMA | g VCl$_2$ | g FZ-800 (75% in ethyl acetate) | g ethyl acetate |
|---|---|---|---|---|---|
| FM-1 | 20 | / | / | / | 17.5 |
| FM-2 | 13 | 5.25 | / | / | 19.3 |
| FM-3 | 13 | 3 | 2.25 | / | 19.3 |
| FM-4 | 13 | 2.6 | 2.25 | 0.6 | 19.3 |

For emulsification the macromer polymer solutions were heated to 65° C. and added to a solution of 0.75 g Ethoquad™ 18/25 in 36.75 g deionized water, whilst stirring. The pre-mixes were subjected to ultra-sound for 2 minutes using a Branson 450 sonifier. Ethyl acetate and acetone were stripped off with a Büchi rotavapor, using waterjet vacuum at 55° C. Milky dispersions were obtained for all examples.

5. Synthesis of HFPO Macromer FM-5

25.0 grams of CF$_3$CF$_2$CF$_2$—O—(CF(CF$_3$)CF$_2$O)$_{9.5}$CF(CF$_3$)CONHCH$_2$CH$_2$O$_2$CC(Me)=CH$_2$, 44 grams N,N-dimethylaminoethyl methacrylate, 29.4 grams HFE 7100, 0.3 grams AIBN and 0.05 gram tert-dodecyl mercaptane were combined in a 250 ml three-necked round bottom flask. The mixture was purged with nitrogen. The reaction was heated to 65° C. under nitrogen and stirred overnight. 1.7 grams acetic acid was added and the reaction was stirred for 15 minutes. A solution of 7.0 grams 30% aqueous Ethoquad™ 18/25 in 89.6 grams DI water was slowly added keeping the temperature >=60° C. The mixture was emulsified with an ultrasonic homogenizer. HFE 7100 was then removed by distillation under reduced pressure at 50° C.

TABLE 1 composition of fluorochemical macromer polymers

| FM | Composition | Ratio |
|---|---|---|
| FM-1 | Homopolymer of (HFPO)$_{8.8}$-alc/IPDI/HEMA | |
| FM-2 | [(HFPO)$_{8.8}$-alc/IPDI/HEMA]/ODMA | 1/1 |
| FM-3 | [(HFPO)$_{8.8}$-alc/IPDI/HEMA]/ODMA/VCl$_2$ | 1/1/1 |
| FM-4 | [(HFPO)$_{8.8}$-alc/IPDI/HEMA]/ODMA/FZ-800/VCl$_2$ | 1/1/1/1 |
| FM-5 | (HFPO)$_{11.5}$-methacrylate/DMAEMA:HOAC | 1/1 |

Examples 1 to 4

In examples 1 to 4, different substrates were treated with fluorochemical macromer polymer compositions as indicated in table 2, so as to give 0.3% SOF. After treatment the fabrics were dried at 160° C. during 1.5 minutes. The treated substrates were tested for their oil and water repellency. The results are summarized in table 2.

TABLE 2

Substrates treated with fluorochemical macromer

| Ex No | FM | Initial PES$\mu$ | | | Initial PA$\mu$ | | | Initial PES/Co | | | Initial Co |
|---|---|---|---|---|---|---|---|---|---|---|---|
| | | OR | WR | SR | OR | WR | SR | OR | WR | SR | OR |
| 1 | FM-1 | 2 | 1 | 70 | 3.5 | 1 | 50 | 3.5 | 1 | 0 | 4 |
| 2 | FM-2 | 1.5 | 1 | 70 | 4.5 | 2 | 60 | 4 | 0 | 0 | 3 |
| 3 | FM-3 | 2 | 1 | 70 | 4 | 2 | 50 | 4 | 0 | 0 | 2.5 |
| 4 | FM-4 | 2 | 1 | 70 | 4 | 1.5 | 60 | 3.5 | 1 | 50 | 2.5 |

The substrates treated with different fluorochemical polyether macromer polymers had especially good oil repellency.

Examples 5 to 7

In examples 5 to 7, cotton substrates were treated with a fluorochemical macromer polymer FM-5, so as to give % SOF as indicated in table 3. After treatment one set of samples was dried at room temperature for 24–48 hours and a second set was cured at 150° C. for 10 minutes. The treated substrates were tested for their oil and water repellency. The results are summarized in table 3.

TABLE 3

Substrates treated with FC acrylic polymer

| Ex | % SOF | Shipp (air dry) OR | SR | Shipp (cure) OR | SR | IND (air dry) OR | SR | IND (cure) OR | SR |
|---|---|---|---|---|---|---|---|---|---|
| 5 | 0.2 | 4 | 0 | 4 | 0 | 4 | 0 | 4 | 0 |
| 6 | 0.5 | 4 | 50 | 4 | 60 | 4.5 | 60 | 4 | 50 |
| 7 | 1 | 5 | 50 | 5 | 70 | 5 | 50 | 5 | 70 |

Cotton substrates with very good oil repellency were obtained, even after air dry conditions.

The invention claimed is:

1. A fluorochemical composition having oil- and/or water-repellent properties on fibrous substrates comprising a fluorinated polymer comprising units derived from (i) a mixture of two or more fluorinated polyether monomers that differ in at least their molecular weight with at least one of said monomers in an amount of at least 90% by weight of said mixture and consisting of fluorinated polyether monomers of the formula:

PF-Q-C(R)=CH$_2$ (I)

wherein PF is a perfluorinated polyether group having a molecular weight of at least 750 g/mol, R is hydrogen or alkyl of 1 to 4 carbon atoms and Q is a divalent linking group selected from the group consisting of:

*—CH$_2$-L$^1$-, *—COO-L$^2$-, *—CONR$^a$-L$^2$-, wherein L$^1$ is a chemical bond or an organic divalent linking group, L$^2$ is an organic divalent linking group and R$^a$ is hydrogen or an alkyl group having 1 to 4 carbon atoms and * indicates the position where the linking group is attached to the group PF in formula (I), and (ii) one or more units derived from one or more co-monomers other than a fluorinated polyether monomer and wherein said co-monomers comprise at least one non-fluorinated monomer.

2. A fluorochemical composition according to claim 1, wherein L$^1$ is selected from the group consisting of an oxy group, an amido group, a carboxy group, a carbonyl group, an aryl group that may be substituted and an alkylene group that may be substituted and/or that may be interrupted with one or more heteroatoms or with an aimido group, a carboxy group, a urethane group or a carbonyl group and wherein L$^2$ is selected from the group consisting of an aryl group that may be substituted and an alkylene group that may be substituted and/or that may be interrupted with one or more heteroatoms or with an amido group, a carboxy group, a urethane group or a carbonyl group.

3. A fluorochemical composition according to claim 1, wherein the amount of units derived from said mixture of fluorinated polyether monomers is between 5 and 70% by weight based on the weight of said fluorinated polymer.

4. A fluorochemical composition according to claim 1 wherein at least one of said co-monomers is a non-fluorinated monomer that comprises a blocked isocyanate group.

5. A fluorochemical composition according to claim 1 wherein said non-fluorinated monomer is selected from the group consisting of chlorine containing monomers and monomers corresponding to the formula:

R$_h$-L-Z wherein Z represents an ethylenically unsaturated group, L represents a chemical bond or an organic divalent linking group and R$_h$ represents a linear, cyclic or branched organic group selected from a hydrocarbon group, hydrocarbon groups that contain cyclic structures, hydrocarbon groups that are interrupted with one or more heteroatoms and hydrocarbon groups that contain a substituent selected from the group consisting of amino groups, hydroxy groups, carboxy groups and amido groups.

6. A fluorochemical composition according to claim 5 wherein said organic divalent linking group is selected from the group consisting of carboxy groups, and oxy groups.

7. A fluorochemical composition according to claim 5 wherein said organic group R$_h$ is selected from linear or branched aliphatic groups having 4 to 30 carbon atoms, hydroxy substituted alkyl groups and amino substituted alkyl groups.

8. A fluorochemical composition according to claim 1 wherein said fluorinated polymer is dispersed in water with the aid of a cationic surfactant.

9. A fluorochemical composition according to claim 1 wherein the weight average particle size of the fluorinated polymer particles is between 50 nm and 400 nm.

10. A fluorochemical composition according to claim 1 wherein said perfluorinated polyether group corresponds to the formula:

R$^1_f$—O—R$^2_f$—(R$^3_f$)$_q$— wherein R$^1_f$ represents a perfluorinated alkyl group, R$^2_f$ represents a perfluorinated polyalkyleneoxy group consisting of perfluorinated alkyleneoxy groups having 1, 2, 3 or 4 carbon atoms or a mixture of such perfluorinated alkylene oxy groups, R$^3_f$ represents a perfluorinated alkylene group and q is 0 to 1.

11. A fluorochemical composition according to claim 10 wherein R$^3_f$ is CF(CF$_3$), q is 1 and R$^2_f$ corresponds to the formula:

—[CF(CF$_3$)—CF$_2$O]$_n$— wherein n is an integer of 3 to 25.

12. A fluorochemical composition according to claim 1 wherein the amount of fluorinated polymer is between 0.1% by weight and 10% by weight.

13. A method of treatment, said method comprising applying to a fibrous substrate a composition as defined in claim 1.

14. A method according to claim 13 wherein the composition is applied in an amount such that the amount of fluorinated polymer on the fibrous substrate is between 0.2% by weight and 3% by weight relative to the weight of the fibrous substrate.

* * * * *

UNITED STATES PATENT AND TRADEMARK OFFICE
CERTIFICATE OF CORRECTION

PATENT NO.        : 7,094,829 B2
APPLICATION NO.   : 10/444878
DATED             : August 22, 2006
INVENTOR(S)       : Frans A. Audenaert It is certified that error appears in the above-identified patent and that said Letters Patent is hereby corrected as shown below:

Title Page
Column 1, line 18, delete "Barlett" and insert -- Bartlett --, therefor.

Column 1
Line 6, after "TO" insert -- THE --.

Column 7
Lines 11-12, delete "5-trimethylcyclohexylis" and insert
-- 5-trimethylcyclohexylisocyanate; --, therefor.

Column 9
Line 35, delete "N-isobutoxymetbyl" and insert -- N-isobutoxymethyl --, therefor.
Line 37, delete "beuzyl" and insert -- benzyl --, therefor.

Column 12
Line 12, delete "a" and insert -- an --, therefor.
Line 55, delete "5 ." and insert -- 5. --, therefor.

Column 16
Line 11, delete "St" and insert -- St. --, therefor.
Line 32, after "n+2" insert -- . --.
Line 64, delete "coloured" and insert -- colored --, therefor.

Column 18
Line 3, delete "44" and insert -- 4.4 --, therefor.

UNITED STATES PATENT AND TRADEMARK OFFICE
CERTIFICATE OF CORRECTION

PATENT NO. : 7,094,829 B2
APPLICATION NO. : 10/444878
DATED : August 22, 2006
INVENTOR(S) : Frans A. Audenaert It is certified that error appears in the above-identified patent and that said Letters Patent is hereby corrected as shown below:

<u>Column 19</u>
Line 7, delete "Ex" and insert -- Ex No --, therefor.
Line 36, claim 1, delete "(I), and (ii)" and insert -- (i), and (ii) --, therefor.
Line 45, claim 2, delete "aimido" and insert -- amido --, therefor.

Signed and Sealed this

Eighth Day of May, 2007

JON W. DUDAS
*Director of the United States Patent and Trademark Office*